(12) United States Patent
Highgate et al.

(10) Patent No.: US 12,322,547 B2
(45) Date of Patent: Jun. 3, 2025

(54) INTEGRATED POLYMER MATERIALS FOR USE IN ELECTROCHEMICAL CELLS

(71) Applicant: SUPERDIELECTRICS SUPERCAP LTD, Cambridge (GB)

(72) Inventors: Donald James Highgate, Cambridge (GB); Brendan James Howlin, Cambridge (GB); Winnie Tang, Cambridge (GB)

(73) Assignee: Superdielectrics Supercap Ltd, Cambridge (GB)

( * ) Notice: Subject to any disclaimer, the term of this patent is extended or adjusted under 35 U.S.C. 154(b) by 306 days.

(21) Appl. No.: 17/757,648

(22) PCT Filed: Dec. 18, 2020

(86) PCT No.: PCT/GB2020/053305
§ 371 (c)(1),
(2) Date: Jun. 17, 2022

(87) PCT Pub. No.: WO2021/123823
PCT Pub. Date: Jun. 24, 2021

(65) Prior Publication Data
US 2023/0015905 A1    Jan. 19, 2023

(30) Foreign Application Priority Data
Dec. 19, 2019    (GB) ..................... 1918896

(51) Int. Cl.
*H01G 11/56* (2013.01)
*C08K 7/06* (2006.01)
*H01G 11/84* (2013.01)

(52) U.S. Cl.
CPC .............. *H01G 11/56* (2013.01); *C08K 7/06* (2013.01); *H01G 11/84* (2013.01); *C08K 2201/001* (2013.01)

(58) Field of Classification Search
None
See application file for complete search history.

(56) References Cited

U.S. PATENT DOCUMENTS 6,430,033 B1    8/2002  Mitsui et al.
11,521,801 B2 * 12/2022  Hong .................... H01G 9/028
(Continued)

FOREIGN PATENT DOCUMENTS

CN       106653391         5/2017
GB         2591987 A   *   8/2021  .............. C08K 7/06
(Continued)

OTHER PUBLICATIONS

Combined Search and Examination Report, GB Application No. 1918896.0, Jun. 8, 2021, 2 pages.
(Continued)

*Primary Examiner* — Dion R. Ferguson
(74) *Attorney, Agent, or Firm* — SALIWANCHIK, LLOYD & EISENSCHENK

(57) ABSTRACT

There is provided herein a process of integrating electrically conductive material into a surface layer of an electrically conductive polymer, comprising the steps of including an electrically conductive material in a polymerisation mixture capable of forming an electrically conductive polymer, such that the material is provided across an uppermost and/or a lowermost region of the polymerisation mixture; and subsequently polymerising the polymerisation mixture. Also provided is an electrically conductive polymer and a supercapacitor formed using the process.

34 Claims, 9 Drawing Sheets

(i) Orientate the particles using a fluid flow through a porous surface or an electrostatic field (ii) Fix the particles e.g. using a poly-vinyl alcohol adhesive (iii) Polymerise the membrane around the particles To produce an orientated particle/membrane surface

(56) References Cited

U.S. PATENT DOCUMENTS

| | | | |
|---|---|---|---|
| 2003/0111247 A1* | 6/2003 | Araki | H01G 11/56 |
| | | | 174/520 |
| 2011/0164349 A1 | 7/2011 | Snyder et al. | |
| 2012/0256600 A1 | 10/2012 | Casasanta | |
| 2012/0304599 A1* | 12/2012 | Ho | H01G 9/00 |
| | | | 53/436 |
| 2018/0075982 A1 | 3/2018 | Hudak et al. | |
| 2022/0181092 A1* | 6/2022 | Highgate | H01G 11/24 |
| 2023/0015905 A1* | 1/2023 | Highgate | H01G 11/84 |

FOREIGN PATENT DOCUMENTS

| | | | | | |
|---|---|---|---|---|---|
| GB | 2625950 A | * | 7/2024 | | C08K 7/06 |
| JP | 2009170897 A | * | 7/2009 | | H01G 11/48 |
| WO | 2017/115064 | | 7/2017 | | |
| WO | WO-2017115064 A1 | * | 7/2017 | | A61B 5/14532 |
| WO | 2017/153705 | | 9/2017 | | |
| WO | 2017/153706 | | 9/2017 | | |
| WO | WO-2017153705 A1 | * | 9/2017 | | C08F 2/16 |
| WO | 2020/208348 | | 10/2020 | | |

OTHER PUBLICATIONS

International Search Report and Written Opinion, International Application No. PCT/GB2020/053305, PCT/ISA/210 and PCT/ISA/237, 8 pages, Apr. 13, 2021.
Combined Search and Examination Report under Sections 17 & 18(3), GB Application No. 2404562.7, Apr. 26, 2024, 1 page.
Search Report under Section 17, GB Application No. 2404562.7, Apr. 25, 2024, 1 page.
Examination Report, under Section 18(3), GB Application No. 1918896.0, Dec. 1, 2023, 2 pages.

* cited by examiner

Figure 3   Polymer Membrane with carbon particles polymerised into its surface.

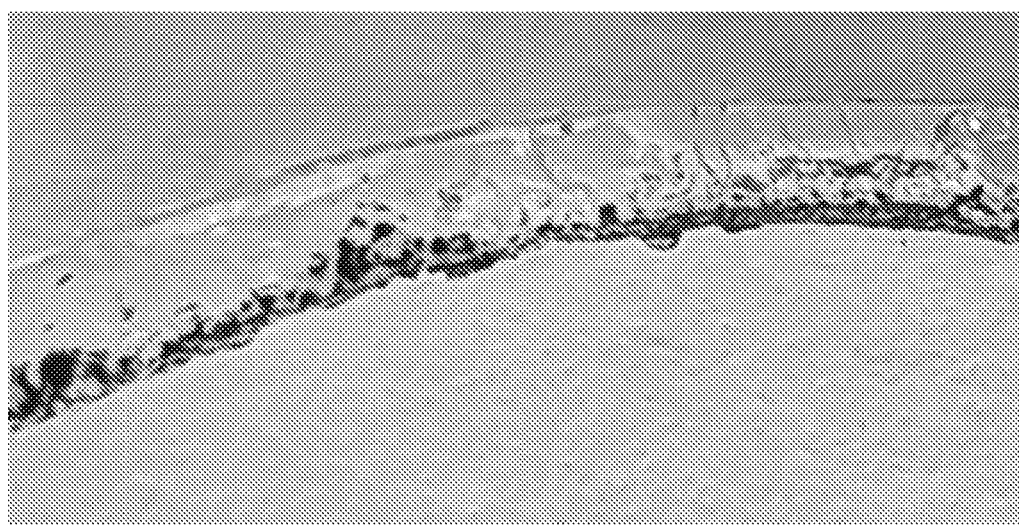
Figure 4  Polymer Membrane with carbon nano-tubes polymerised into its surface.

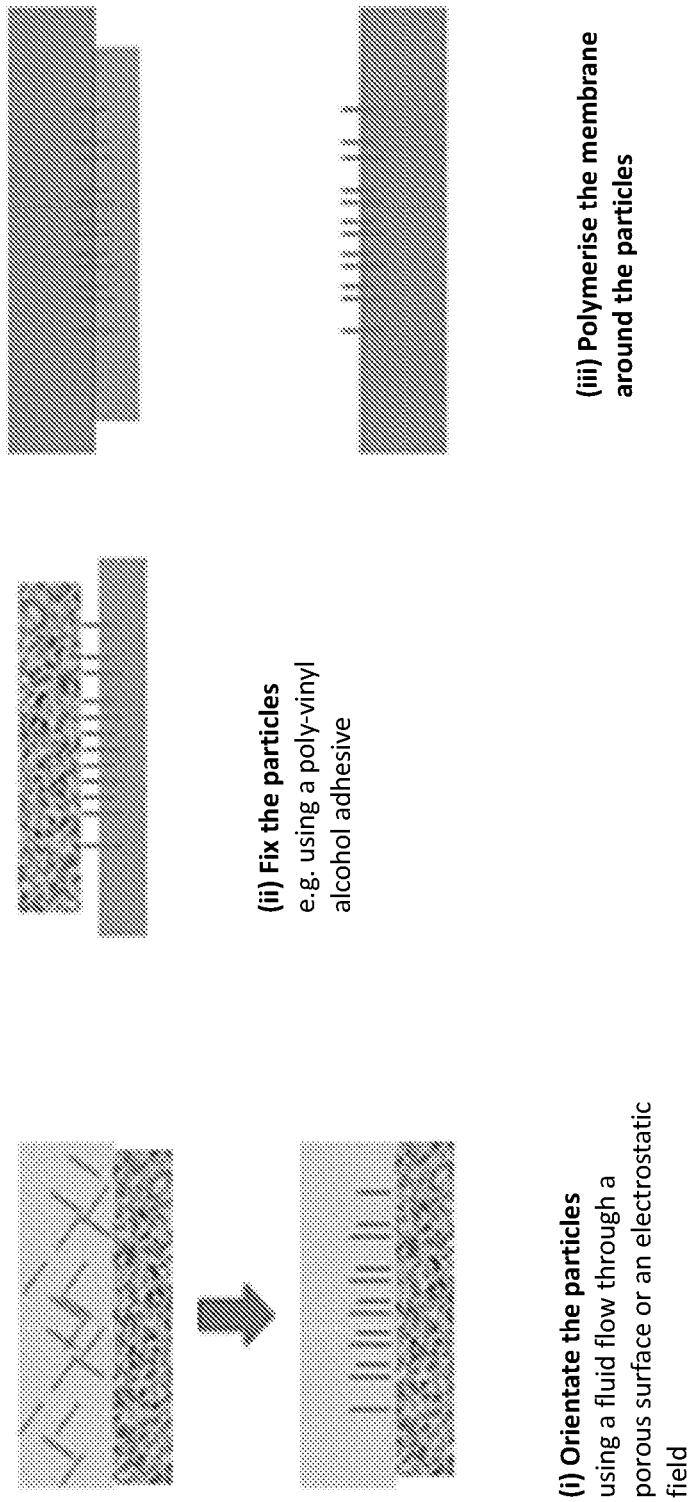
Figure 5 To produce an orientated particle/membrane surface

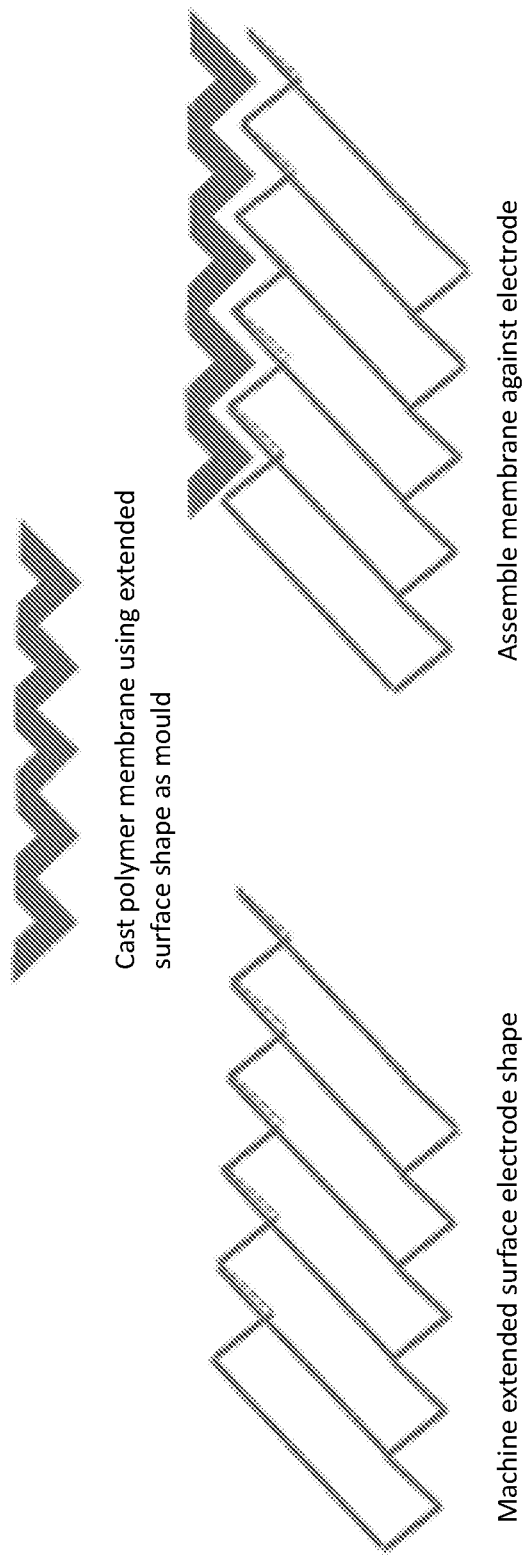
Figure 6  Example of extended surface membrane/electrode structure (for illustration only)

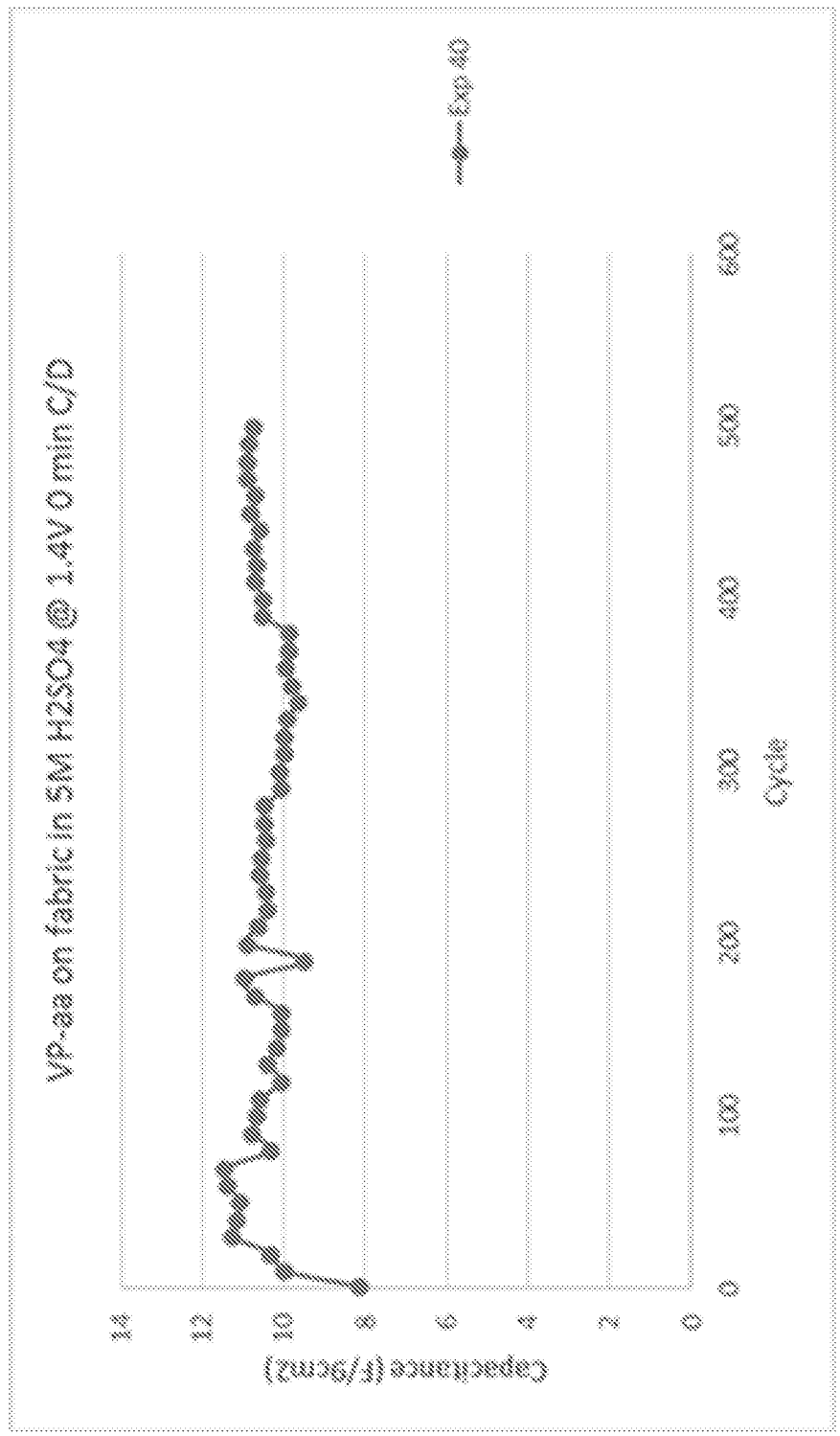
Figure 7: Graph showing the capacitance of a 9cm² cell made with an integrated VP-amino acid polymer integrated into a woven carbon fabric in contact with smooth carbon foil electrodes

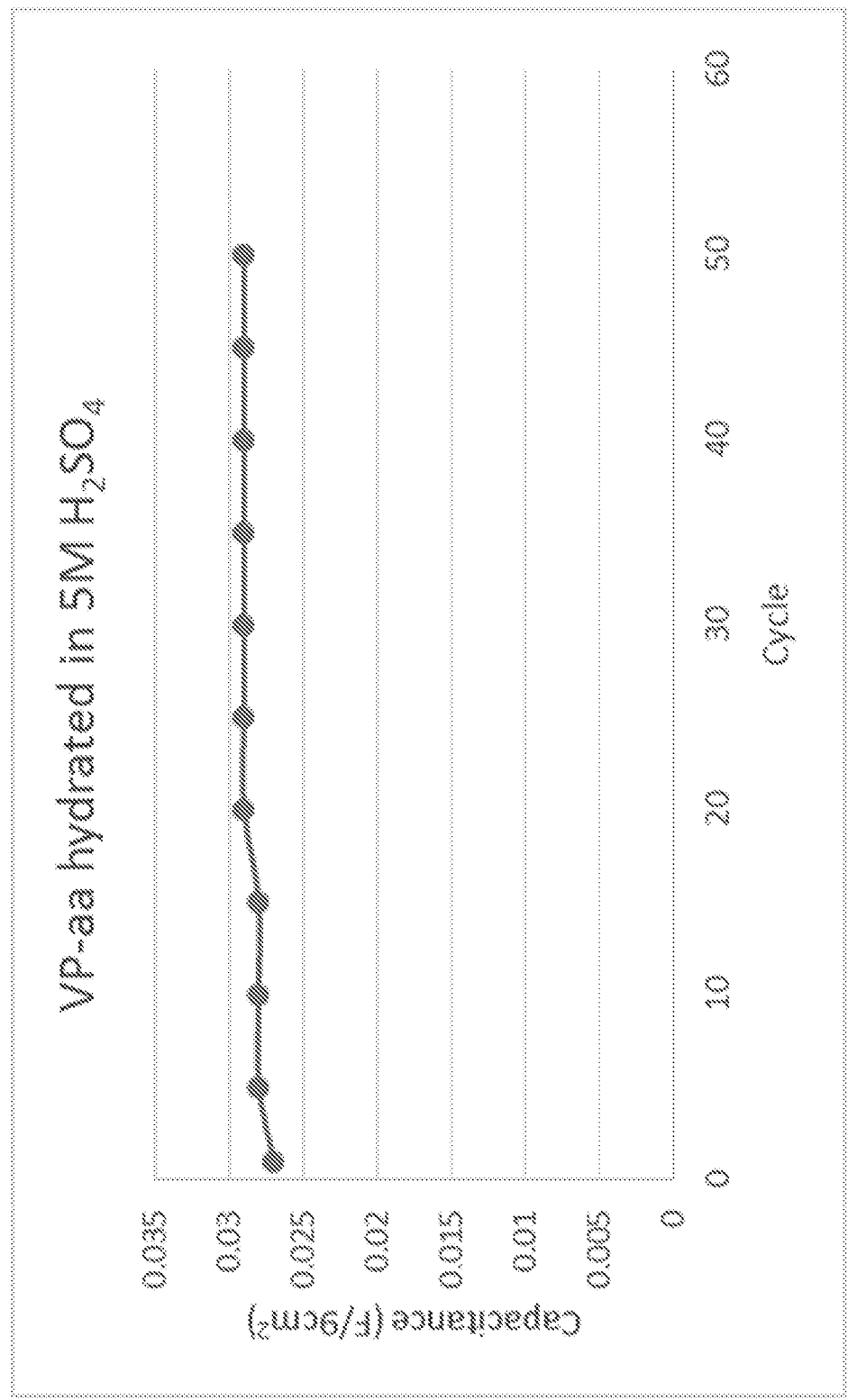
Figure 8: Graph showing the capacitance of a 9cm² cell made with a VP-amino acid polymer membrane in contact with smooth carbon foil electrodes

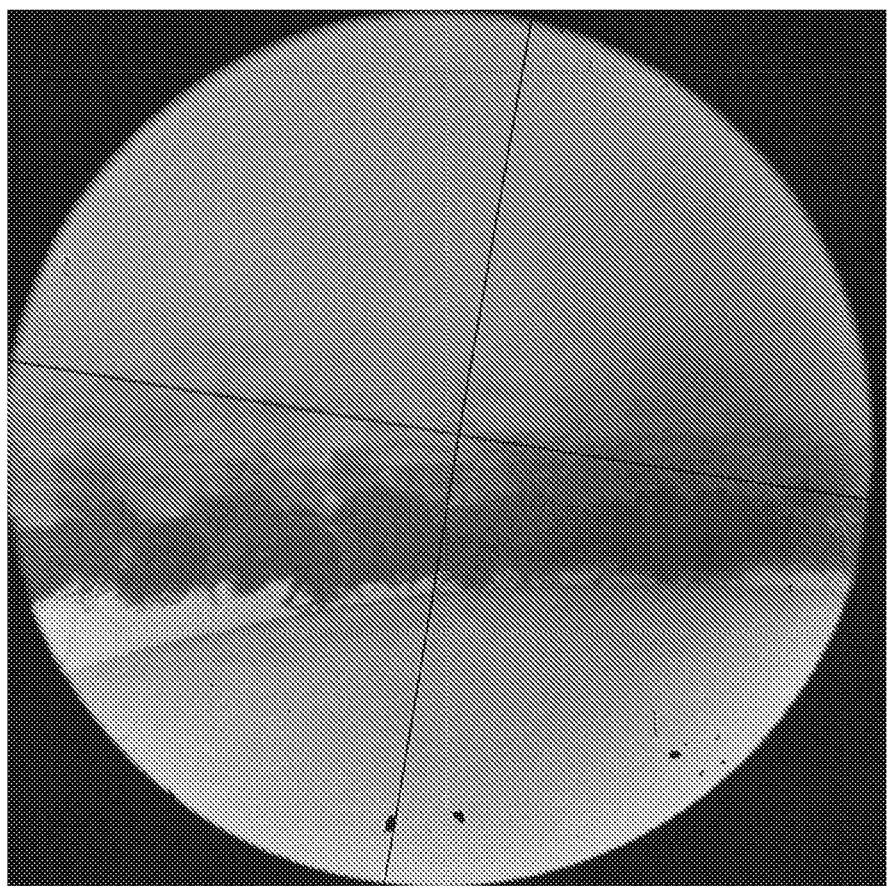
Figure 9: Microphoto of the integrated polymer/electrode interface

INTEGRATED POLYMER MATERIALS FOR USE IN ELECTROCHEMICAL CELLS

CROSS-REFERENCE TO RELATED APPLICATIONS

This application is a national stage application of International Patent Application No. PCT/GB2020/053305, filed Dec. 18, 2020, which claims priority to Great Britain Application No. 1918896.0, filed Dec. 19, 2019, the disclosures of each of which are incorporated herein by reference in their entirety, including any figures, tables, and drawings.

FIELD OF THE INVENTION

The present invention relates to integrated polymer electrode materials, and their use as a component in supercapacitors.

BACKGROUND OF THE INVENTION

Conventional capacitors offer a means of storing electrical energy. Generally, conventional capacitors are composed of a pair of electrically conducting plates (which thereby act as a pair of electrodes), separated by a dielectric material. The dielectric material generally has low conductivity but can be polarized by an electric field. As such, when the electrodes experience a potential difference, an electric field develops across the dielectric material, allowing electrical energy to be stored. However, the maximum capacitance values achieved by conventional capacitors are such that the electrical energy storage capacity is generally lower than that of electrochemical batteries.

Meanwhile, supercapacitors achieve significantly higher capacitance values compared to conventional capacitors, and so offer an increased energy storage capacity. Supercapacitors are generally composed of two electrodes and an electrolyte component located therebetween. The electrolyte component is generally ionically conductive (which therefore contrasts with the nature of the dielectric component of conventional capacitors, which as mentioned is generally of low conductivity). Within a supercapacitor, electrical energy is stored mainly by way of two principles: electrostatic capacitance (due to the charge distribution within the electrolyte component), and electrochemical capacitance (due to electrical energy from reversible oxidation-reduction (redox) reaction between the electrolyte and the electrodes); within a supercapacitor, energy may be stored by way of one or both of these two principles. There are multiple different kinds of supercapacitor systems, including double-layer supercapacitors, pseudo-capacitive supercapacitors, and hybrid supercapacitors. Double-layer supercapacitors typically comprise carbon electrodes that are of comparatively low cost. The capacitance of double-layer supercapacitors is largely electrostatic capacitance. Meanwhile, pseudo-capacitive supercapacitors comprise comparatively higher cost electrodes that are capable of undergoing a redox reaction together with the electrolyte. Such redox active electrodes can comprise, for example, ruthenium or vanadium. The capacitance of pseudo-capacitive supercapacitors is therefore increased (or augmented) by electrochemical capacitance. Hybrid supercapacitors comprise a combination of electrodes with differing characteristics and can for example comprise one carbon electrode and one electrode capable of undergoing a redox reaction with the electrolyte. The capacitance of hybrid supercapacitors is therefore a combination of electrostatic capacitance and electrochemical capacitance.

Increasing capacitance (and so the energy storage capacity) of a supercapacitor is desirable. The maximum capacitance value achieved by a supercapacitor may depend on the nature of the electrolyte and the nature of the electrodes. For example, technologies exist to increase the effective surface area of each electrode plate which directly increases capacitance, and this represents the most recent improvement in supercapacitor performance. The development of electrodes having very large effective areas has been achieved, for example, by the development of nano-structures grown or deposited on the electrode surface—such "extended surface" electrodes therefore have increased surface area compared to smooth electrodes. Typical examples are shown in FIG. 1, consisting of regular arrays of nano rods, or in FIG. 2, consisting of irregular structures based on carbon microparticles. However, there are various shortcomings associated with extended surface electrodes. For instance, challenges exist with the manufacturing of electrodes with extended surface areas compared with simple "smooth surface" electrodes, as well as their assembly with the electrolyte. Further, in order to realise the full potential of the additional area provided by extended surface electrodes, only an electrolyte that is able to penetrate the nano-/microstructure of the extended electrode surface can be used. This restricts use to conventional supercapacitor electrolytes, i.e. those that are liquid, and whilst gelatinous electrolytes may be used, the properties of these must be such that they do not exhibit a yield stress that would prevent penetration of the extended electrode surface. This therefore precludes the use of more advanced options for the electrolyte component when using extended surface electrodes. For instance, WO2017/153705, WO2017/153706, and WO2017/115064 teach the production of electrically conducting cross-linked hydrophilic polymers which can be used in place of a conventional liquid electrolyte in a supercapacitor. These materials have favourable electrical properties, but, being solid, are not suitable for penetrating the nano-/microstructure of an extended electrode surface, and so cannot realise the full potential of such extended surfaces.

In summary there remains a need for improved technologies for increasing capacitance.

SUMMARY OF THE INVENTION

A new and surprising means by which to increase capacitance is provided herein. This is achieved by way of a new "integrated" polymer structure, provided by the integration of electrically conductive material within a surface layer of an electrically conductive polymer. This "integrated" polymer, when included as the electrolyte component of a supercapacitor, enables increased capacitance, thereby improving energy storage capacity. Without wishing to be bound by theory, it is thought that when the integrated polymer contacts the electrode surface, an increased effective surface area at the electrolyte/electrode interface is provided, achieved by the electrically conductive material integrated within the polymer's surface layer. This increase in effective surface area is provided without the necessity for a conventional extended surface electrode, thereby allowing simple smooth surface electrodes to be used. In effect the material that would conventionally constitute the extended surface of the electrode and are integral to the electrode surface are here integrated into the surface of the polymer membrane electrolyte.

In a first aspect, there is a process of integrating electrically conductive material into a surface layer of an electrically conductive polymer, comprising the steps of:

including an electrically conductive material in a polymerisation mixture capable of forming an electrically conductive polymer, such that the material is provided across an uppermost and/or a lowermost region of the polymerisation mixture; and subsequently polymerising the polymerisation mixture.

The process according to the first aspect is a surprisingly effective way to achieve the integrated polymer. Without wishing to be bound by theory, it is thought that during this process the electrically conductive material becomes encapsulated in a surface layer of the resulting polymer. The resulting polymer has the material integrated in a surface layer such that it does not leach out/rub off, representing an improvement over merely "dip-coating" the polymer in particulate material.

In a second aspect, there is a process of forming an electrically conductive polymer containing an electrically conductive material integrated at both top and bottom surfaces, comprising the steps of:

including an electrically conductive material in a monomer or pre-polymer mixture;

applying the conductive material-monomer mixture across a top surface and a bottom surface of an electrically conductive polymer; and polymerising the monomer mixture;

thereby forming an electrically conductive polymer containing an electrically conductive material integrated at the top and bottom surfaces of said polymer.

The process according to the second aspect is directed towards achieving a polymer with electrically conductive material integrated at both outer surfaces of the polymer (top and bottom). It is thought that during this process the electrically conductive material integrates at the top and bottom surfaces of the polymer, thereby resulting in a polymer with the material incorporated such that it does not leach out/rub off, representing an improvement over merely "dip-coating" the polymer in particulate material.

In a third aspect, there is a process of forming a supercapacitor, comprising the steps of:

integrating electrically conductive material into a surface layer of an electrically conductive polymer using the process of the first aspect or the second aspect; and positioning the polymer between two electrodes.

In a fourth aspect, there is an electrically conductive polymer containing an electrically conductive material integrated in a surface layer. This polymer is obtainable by the process according to the first aspect or the second aspect.

In a fifth aspect, there is the use of a polymer according to the fourth aspect in a supercapacitor.

In a sixth aspect, there is a supercapacitor comprising two electrodes and a polymer according to the fourth aspect located therebetween.

DETAILED DESCRIPTION

As used herein, the term "polymerisation mixture" refers to a solution or dispersion of polymer-forming components. The mixture is generally homogenous, meaning that the polymer-forming components are uniformly dissolved or mixed.

The polymerisation mixture used in the process disclosed herein is one that is capable of forming a polymer that is suitable for functioning as the electrolyte component in a supercapacitor. As such, the polymerisation mixture used in the process disclosed herein is capable of forming a polymer that is electrically conductive. As used herein, the term "electrically conductive" takes its usual definition in the art, and so can encompass materials that are electronically conductive and/or ionically conductive, i.e. materials that employ some form of electron and/or ionic mobility. The electrically conductive polymer can be electronically conductive and/or ionically conductive. Preferably, the electrically conductive polymer is electronically conductive.

As used herein, the term "electronically conductive" takes its usual definition in the art, and refers to a material in which there is some form of electron mobility, such that the conduction process is principally dependent upon electron transfer, or in which an electron is yielded as an output at an interface.

As used herein, the term "ionically conductive" takes its usual definition in the art, and refers to a material in which there is some form of ionic mobility, such that the conduction process is principally dependent on ion transfer.

As used herein, the term "polymer" takes its usual definition in the art and so refers to a homopolymer or a copolymer formed from the polymerisation of one or more monomers. As used herein, the term "homopolymer" takes its usual definition in the art, and so refers to a polymer whose polymer chains comprise one type of monomer. As used herein, the term "co-polymer" takes its usual definition in the art, and so refers to a polymer whose polymer chains comprise two or more different types of monomers. As used herein, the term "monomer" takes its usual definition in the art, and so refers to a molecular compound that may chemically bind to another monomer to form a polymer.

The polymerisation mixture used in the process disclosed herein is preferably one that is capable of forming a hydrophilic polymer. When this is the case, the process forms a hydrophilic electrically conductive polymer with electrically conductive material integrated in a surface layer. As used herein, the term "hydrophilic polymer" refers to a polymer that dissolves in water when it is not cross-linked, but when cross-linked absorbs water and swells to form a stable elastic solid. Hydrophilic polymers possess certain benefits due to their water properties.

The polymerisation mixture used in the process disclosed herein is preferably one that is capable of forming a cross-linked polymer. When this is the case, the process forms a cross-linked electrically conductive polymer with electrically conductive material integrated in a surface layer. As used herein, the term "cross-linker" refers to molecular compound capable of forming chemical bonds between polymer chains. A polymer that includes such chemical bonds between its chains is referred to as a "cross-linked" polymer.

Preferably, the polymerisation mixture used in the process disclosed herein is capable of forming a polymer that is both cross-linked and hydrophilic. When this is the case, the process forms a cross-linked hydrophilic electrically conductive polymer with electrically conductive material integrated in a surface layer.

As used herein, the term "hydrophilic monomer" takes its usual definition in the art, and so refers to a monomer with an affinity for water molecules. The term "hydrophobic monomer" also takes its usual definition in the art, and so refers to a monomer that repels water molecules.

Preferably, the polymerisation mixture comprises at least one hydrophobic monomer, at least one hydrophilic monomer, and at least one cross-linker, the polymerisation mixture further comprising one or the other of at least one electronically conductive polymer, or at least one amino acid. A polymer resulting from such a polymerisation mixture is electronically conductive, has particularly good water properties (i.e. good properties/behaviour in relation to water and other aqueous environments), and performs particularly well when used as the electrolyte component in a supercapacitor. Details of such polymers are disclosed in WO2017/153705 and WO2017/115064.

As mentioned above, the polymerisation mixture can comprise at least one hydrophobic monomer. The polymerisation mixture may comprise one hydrophobic monomer.

Preferably, the at least one hydrophobic monomer is selected from methyl methacrylate, allyl methacrylate, acrylonitrile, methacryloxypropyltris(trimethylsiloxy)silane, 2,2,2-trifluoroethyl methacrylate, or a combination thereof. More preferably, the at least one hydrophobic monomer is selected from acrylonitrile and methyl methacrylate, or a combination thereof.

As mentioned above, the polymerisation mixture can comprise at least one hydrophilic monomer. The polymerisation mixture may comprise one hydrophilic monomer.

Preferably, the at least one hydrophilic monomer is selected from methacrylic acid, 2-hydroxyethyl methacrylate, ethyl acrylate, vinyl pyrrolidone, propenoic acid methyl ester, monomethacryloyloxyethyl phthalate, ammonium sulphatoethyl methacrylate, poly vinyl alcohol or a combination thereof. More preferably, the at least one hydrophilic monomer is selected from 1-vinyl-2-pyrrolidone (VP) and 2-hydroxyethyl methacrylate, or a combination thereof.

The at least one cross-linker can be methylenebisacrylamide, N-(1-Hydroxy-2,2-dimethoxyethyl)acrylamide, allyl methacrylate and ethylene glycol dimethacrylate. Preferably, the cross-linker allyl methacrylate and ethylene glycol dimethacrylate. The cross-linker may be hydrophobic or hydrophilic.

It will be appreciated from the definitions above, that the terms "hydrophobic monomer" and "cross-linker" are not necessarily mutually exclusive. Disclosed herein, the hydrophobic monomer and the cross-linker may be the same or different. The hydrophobic monomer may, in certain embodiments, be the same as the cross-linker. For example, in certain embodiments, both the cross-linker and the hydrophobic monomer are allyl methacrylate. In other embodiments, the hydrophobic monomer is non-cross-linking, and in such embodiments, the cross-linker and the hydrophobic monomer are different chemical species. Preferably, the hydrophobic monomer is a different chemical species to the cross-linker. Generally, the hydrophobic monomer is a different chemical species to both the cross-linker and the hydrophobic monomer.

In a preferred embodiment, the polymerisation mixture further comprises a polymerisation initiator. The polymerisation initiator may be azobisisobutyronitrile (AIBN) or 2-hydroxy-2-methylpropiophenone. The presence of a polymerisation initiator is particularly preferred when the polymerisation is by thermal means or by ultra-violet radiation. In one embodiment, the polymerisation is by thermal means and the initiator is azobisisobutyronitrile (AIBN). In a second embodiment the polymerisation is by UV and the initiator is 2-hydroxy-2-methylpropiophenone.

In one embodiment the polymerisation mixture comprises at least one hydrophobic monomer, at least one hydrophilic monomer, at least one electronically conductive polymer, and at least one cross-linker. A polymer resulting from such a polymerisation mixture is electronically conductive, has particularly good water properties, excellent mechanical properties, excellent electrical conductivity, and provides particularly high capacitance values.

Preferably, the at least one electronically conductive polymer is selected from polyethylenedioxythiophene (preferably polyethylenedioxythiophene:polystyrene sulphonate), polypyrrole, polyaniline, polyacetylene, or a combination thereof. More preferably, the intrinsically electronically active material is polyethylenedioxythiophene:polystyrene sulphonate (PEDOT:PSS).

In one embodiment, the polymerisation mixture comprises at least one hydrophobic monomer, at least one hydrophilic monomer, at least one amino acid, and at least one cross-linker. A polymer resulting from such a polymerisation mixture is electronically conductive, which is thought to be due to the electron conjugation within the aromatic system/the delocalised electron lone pairs in the amino acid favourably altering the electronic properties of the polymer material. As used herein, the term "amino acid" takes its usual definition in the art, and so refers to an organic compound with amino and carboxylic acid functional groups, and a side-chain that is specific to each amino acid. The term encompasses traditional "natural" amino acids but also any compound with an amino acid backbone (i.e. with any side-chain). Preferably, the amino acid (preferably a natural amino acid) comprises, in its side chain, an aromatic group.

In one embodiment, the at least one amino acid is selected from phenylalanine, tryptophan, histidine, ethylenediaminetetraacetic acid (EDTA) and tyrosine, or a combination thereof. Preferably, the at least one amino acid is selected from phenylalanine, tryptophan, histidine and tyrosine or a combination thereof. Still more preferably, the at least one amino acid is selected from phenylalanine and tryptophan, or a combination thereof.

Disclosed herein, after the electrically conductive material has been included in the polymerisation mixture such that the material is provided across an uppermost and/or a lowermost region of the polymerisation mixture, the polymerisation mixture is polymerised, thereby forming an electrically conductive polymer with electrically conductive material integrated in a surface layer. The polymerisation mixture may be polymerised by UV, thermal or gamma radiation. Preferably, the polymerisation mixture is polymerised by thermal or gamma radiation. As the skilled person will appreciate, gamma radiation may be carried out under ambient temperature and pressure, whilst thermal polymerisation may be carried out at temperatures up to 70° C.

After polymerisation to form the electrically conductive polymer containing an electrically conductive material integrated in its surface layer, the polymer may be hydrated. This hydration step may be carried out using distilled deionized (DD) water, or with an aqueous solution, such as saline, brine, acid, or alkali solution. When saline solution is used for the hydration step, the saline solution preferably has 0.002 g/cc to 0.1 g/cc of NaCl in water, more preferably 0.009 g/cc of NaCl in water. When brine solution is used for the hydration step, the brine solution preferably has 0.3 g/cc of NaCl in water. When acid solution is used for the hydration step, the acid is preferably 5 mol/dm$^3$ H$_2$SO$_4$. When alkali solution is used for the hydration step, the alkali solution is preferably an aqueous solution of KOH with the KOH is present at 10 wt % to 30 wt %. This hydration can result in improved performance in terms of the electrical properties of the polymer.

Disclosed herein, the process comprises the step of including an electrically conductive material in a polymerisation mixture capable of forming an electrically conductive polymer, such that the material is provided across an uppermost and/or a lowermost region of the polymerisation mixture. It will be understood that by way of this, the electrically conductive material is provided as a layer distributed across the uppermost and/or lowermost region of the polymerisation mixture. It will be understood that the uppermost region of the polymerisation mixture refers to the region spanning the top of the polymerisation mixture, i.e. the region where material of a density lower than the polymerisation mixture would generally rise to if left under gravity. Conversely it will also be understood that the lowermost region of the polymerisation mixture refers to the region spanning the bottom of the polymerisation mixture, i.e. the region where material of a density higher than the polymerisation mixture would generally settle to if left under gravity. Each of the uppermost and lowermost regions generally has a thickness of 5-120 μm, preferably of 10-110 μm. Generally, the electrically conductive material is therefore provided such that it is distributed throughout the uppermost and/or lowermost 5-120 μm of the polymerisation mixture, more preferably the uppermost and/or lowermost 10-110 μm of the polymerisation mixture. By providing the material across an uppermost and/or a lowermost region of the polymerisation mixture, the electrically conductive material is trapped in these regions during polymerisation thereby forming a polymer with electrically conductive material integrated into a surface layer. It will be understood that "a surface layer" means "at least one surface layer". Integration into a surface layer allows the integrated material to form part of the electrolyte/electrode interface when the integrated polymer is positioned between two electrodes and used as the electrolyte component in a supercapacitor. The term "surface layer" refers to a layer corresponding to the top or bottom outer-most region of polymer, each region typically having a thickness of 5-120 μm, preferably 10-110 μm where the conducting material is in particulate form and up to 250 μm for woven or felted materials. Disclosed herein, the material may be integrated into the top surface layer of the polymer (achieved by providing the material across the uppermost region of the polymerisation mixture) and/or the bottom surface layer of the polymer (achieved by providing the material across the lowermost region of the polymerisation mixture).

Preferably, the electrically conductive material is provided across an uppermost region and/or a lowermost region of the polymerisation mixture such that it occupies a particularly desirable volume of the region in question. When this is the case, a particularly desirable density of inter particle contacts is achieved, leading to a particularly desirable effective conductivity at the electrolyte/electrode interface. As such the electrically conductive material is preferably provided across the uppermost and/or lowermost region in an amount corresponding to 20-70% by volume, preferably 40-50% by volume, based on the volume occupied by the electrically conductive material plus the volume of the polymerisation mixture in the respective region. These volume % s correspond with a desirable density of inter particle contacts and so a desirable effective conductivity at the electrolyte/electrode interface, It will be understood that the weight % s corresponding with these volume % s will vary depending on the densities of the electrically conductive material and the polymerisation mixture of the uppermost/lowermost regions. For example, the density of the polymerisation mixture is generally 1-1.5 gm/cc, the density of electrically conductive carbon is generally 0.4-2.5 gm/cc, and the density of transition metal oxides can vary, for example from 5-12 gm/cc. Therefore to achieve the desirable volume % s when the electrically conductive material is electrically conductive carbon, it is preferably provided across the uppermost and/or lowermost region in an amount corresponding to 10-50% by weight, based on the weight of the electrically conductive material plus the weight of the polymerisation mixture in the respective region. Meanwhile, to achieve the desirable volume % s when the electrically conductive material is a transition metal oxide, it is preferably provided across the uppermost and/or lowermost region in an amount corresponding to 50-90% by weight, based on the weight of the electrically conductive material plus the weight of the polymerisation mixture in the respective region.

When the material is integrated into just one or the other of the top surface layer and the bottom surface layer of the polymer (achieved by providing the material across one or the other of the uppermost region and the lowermost region of the polymerisation mixture) the polymer is referred to herein as being "single sided". Preferably, the material is integrated into both the top surface layer and the bottom surface layer of the polymer (achieved by providing the material across both the uppermost region and the lowermost region of the polymerisation mixture)—such polymers are referred to herein as being "double sided", In such double sided systems, generally the same electrically conductive material is provided across both the uppermost and the lowermost regions, however it will be appreciated that if required the electrically conductive material provided across the uppermost region can be different to that provided across the lowermost region, for example if there is a desire to produce asymmetric electrode structures providing for different electro-chemical properties at the anode and cathode.

After including an electrically conductive material in the polymerisation mixture and subsequently polymerising the polymerisation mixture, the resulting polymer formed by the process may take a variety of different shapes, but generally the polymer will comprise a top surface, a bottom surface, and a number of wall-like sides (typically four). Typically, the polymer approximates to a substantially 3D planar shape. Generally, the thickness of the polymer (i.e. the distance between the top surface and the bottom surface) formed by the process disclosed herein is in the range of 25 μm to 2 mm.

The electrically conductive material may be provided in various forms, including particulate form (specific examples including powdered transition metal oxides or powdered electrically conductive carbon), sheet form (specific examples including sheets of electrically conductive carbon, in particular graphene sheets), or as a plurality of fibres (specific examples including electrically conductive carbon fibres) which may be provided either as a plurality of individual fibres, or as a plurality fibres woven or felted into a cloth-like fabric. Preferably, the electrically conductive material is provided in either particulate form, or as a plurality of fibres woven or felted into a cloth-like fabric. When the electrically conductive material is in particulate form, i.e. when the electrically conductive material is provided as a plurality of particles, it is thought that particularly good integration into a surface layer of the resulting polymer is achieved. Meanwhile when the electrically conductive material is provided as a plurality of fibres woven or felted into a cloth-like fabric, good results are achieved as well as reducing manufacturing time. It will be understood that the term "woven" refers to the interlacement of fibres to form the cloth-like fabric, and the term "felted" refers to the packing together of fibres to form the cloth-like fabric.

When the electrically conductive material is in particulate form, it can be provided as a plurality of particles with dimensions small enough to fall in the nm to μm range. For example, the electrically conductive material can be provided as a plurality of particles with dimensions of 500 nm to 200 μm. Preferably, the electrically conductive material is provided as a plurality of particles with dimensions of at least 1 μm, more preferably at least 10 μm. Preferably, the electrically conductive material is provided as a plurality of particles with dimensions of less than 150 μm, more preferably of less than 100 μm. The skilled person will be familiar with the techniques necessary to measure the relevant dimensions of the particles e.g. by way of image analysis, whereby particles flow through a capillary tube, and are scanned by an image analyser to measure the relevant dimensions, a suitable apparatus being the Sysmex FPIA-3000 Flow Particle Image Analyzer. Electrically conductive material in particulate form is shown integrated into a polymer using the process disclosed herein in FIG. 3.

When the electrically conductive material is in particulate form, the shape of the particles may be defined by way of the aspect ratio, where the aspect ratio is defined as the largest dimension divided by the smallest orthogonal dimension (which for tube-like particles therefore equates to length divided by diameter). The higher the aspect ratio, the more elongate the particle, the lower the aspect ratio, the more spherical the particle. The electrically conductive material may consist of particles with an aspect ratio of less than 100:1, preferably less than 50:1, more preferably less than 10:1. The electrically conductive material may consist of particles with an aspect ratio of at least 2:1, preferably at least 3:1. Preferably, the electrically conductive material consists of particles with an aspect ratio between 3:1 and 10:1. With regards to measuring the aspect ratio, the skilled person will (as stated above) be familiar with how to measure the relevant dimensions of the material, e.g. by way of image analysis, whereby particles flow through a capillary tube, and are scanned by an image analyser to measure the relevant dimensions of the particles, a suitable apparatus being the Sysmex FPIA-3000 Flow Particle Image Analyzer. By this method the largest dimension and the smallest orthogonal dimension are measured, and these are then used to calculate the aspect ratio. Electrically conductive material in elongated particulate form is shown integrated into a polymer using the process disclosed herein in FIG. 4.

When the electrically conductive material is in particulate form, it may be provided as a plurality of particles whose mass median diameter is 500 nm to 200 μm. Preferably, the mass median diameter is at least 1 μm, more preferably at least 10 μm. Preferably, the mass median diameter is less than 150 μm, more preferably less than 100 μm. The skilled person will be familiar with how to measure the mass median diameter, for instance by laser diffraction by way of a Malvern-Panalytical 'Zetasizer'.

The electrically conductive nature of the material is such that when the integrated polymer is used as the electrolyte component of a supercapacitor and contacts an electrode surface, an extended effective surface area at the electrolyte/electrode interface is provided. The material may therefore be any appropriate electrically conductive material, particularly those materials that are otherwise used to form electrode components—the skilled person will be familiar with such materials. For example, the electrically conductive material can be electrically conductive carbon, a transition metal oxide, or combinations thereof. Such materials are otherwise used to form electrodes, and therefore such materials are particularly effective in forming the extended electrolyte/electrode interface afforded by the integrated polymer disclosed herein.

The term "transition metal oxide" refers to the oxide of a metal that features in the d-block (i.e. from group 3 to group 12) of the periodic table. The transition metal oxide may be MnO, $MnO_2$, $NaMnO_2$; $ZnO_2$; $Fe_2O_3$; $MoS_2$, $V_2O_5$, $RuO_2$, $IrO_2$, or combinations thereof. Preferably, the transition metal oxide is $MnO_2$, MnO, $ZnO_2$, $NaMnO_2$, $Fe_2O_3$, or $MoS_2$.

Preferably, the electrically conductive material is electrically conductive carbon. The electrically conductive carbon is preferably activated carbon, i.e. carbon material that includes pores to increase its surface area. The skilled person will be familiar with the forms of carbon that are electrically conductive. For example, the electrically conductive carbon can be in the form of activated carbon powder, powdered graphite, one or more graphene sheets, powdered graphene, powdered graphane, powdered carbon nanotubes, activated carbon fibres—provided either as a plurality of individual fibres (which can be formed by the rolling up of carbon sheets), or as a plurality fibres woven or felted into a cloth-like fabric—or combinations thereof. Preferably, the electrically conductive material is in particulate form, or is provided as a plurality of fibres woven or felted into a cloth-like fabric, and so preferably, the electrically conductive carbon is in the form of activated carbon powder, powdered graphite, powdered graphene, powdered graphane, powdered carbon nanotubes, or a plurality of activated carbon fibres woven or felted into a cloth-like fabric, or combinations thereof. A specific example of electrically conductive material provided as a plurality of activated carbon fibres woven or felted into a cloth-like fabric is Kynol activated carbon fabric ACC-5092-15.

Although the integrated polymers disclosed herein need not be used with non-smooth electrode surfaces, they are compatible with non-smooth surfaces. The effective surface area can be further increased by casting the polymerisation mixture against a suitably shaped surface to act as a mould during the formation of the polymer, applying the process disclosed herein, and then matching the integrated polymer with a machined electrode of the same profile. This is shown schematically in FIG. 6, and may in particular be used when the electrically conductive material is in the form of a plurality of activated carbon fibres woven or felted into a cloth-like fabric.

The process may comprise the step of allowing the polymerisation mixture to stand after the inclusion of the electrically conductive material and prior to polymerising the polymerisation mixture. This may be particularly appropriate when the electrically conductive material is a woven or felted cloth-like fabric, to allow time for the polymerisation mixture to soak sufficiently into the woven or felted structure. It will be understood that the exact duration of time that the polymerisation mixture is left to stand for can be tailored depending on the exact nature of the cloth-like fabric. For example, the process may comprise the step of allowing the polymerisation mixture to stand after the inclusion of the electrically conductive material for at least 30 seconds, at least 1 minute, at least 5 minutes, or at least 10 minutes, prior to polymerising the polymerisation mixture. The polymerisation mixture may be left to stand after the inclusion of the electrically conductive material for up to 90 minutes, or up to 60 minutes, prior to polymerising the polymerisation mixture.

The electrically conductive material may be provided across an uppermost and/or a lowermost region of the polymerisation mixture by:
  settlement under gravity, or
  settlement under centrifuge, or
  use of a supporting surface.

The specifics of these processes are described in more detail below, as is how they can be combined with each other or with other process steps to form a "double sided system"—that is, wherein the electrically conductive material is integrated into both the top surface layer and the bottom surface layer of the polymer.

Settlement Under Gravity

The electrically conductive material may be provided across an uppermost and/or a lowermost region of the polymerisation mixture by settlement under gravity.

Allowing the polymerisation mixture to stand after the inclusion of the electrically conductive material and prior to polymerising the polymerisation mixture may be particularly appropriate when looking to provide the electrically conductive material across the uppermost and/or lowermost region of the polymerisation mixture by settlement under gravity. When the electrically conductive material has a density that is higher than that of the polymerisation mixture, the material is able to settle under gravity across the lowermost region of the polymerisation mixture. Meanwhile when the electrically conductive material has a density that is lower than that of the polymerisation mixture, the material is able to rise under gravity to settle across the uppermost region of the polymerisation mixture. It will be understood that the exact duration of time that the polymerisation mixture is left to stand for can be tailored depending on the density differential between the polymerisation mixture and the electrically conductive material, and the viscosity of the polymerisation mixture. For example, the process may comprise the step of allowing the polymerisation mixture to stand after the inclusion of the electrically conductive material for at least 30 seconds, at least 1 minute, at least 5 minutes, or at least 10 minutes, prior to polymerising the polymerisation mixture. The polymerisation mixture may be left to stand after the inclusion of the electrically conductive material for up to 90 minutes, or up to 60 minutes, prior to polymerising the polymerisation mixture.

Settlement Under Centrifuge

The electrically conductive material may be provided across an uppermost and/or a lowermost region of the polymerisation mixture by settlement under centrifuge. Here, the process comprises the step of subjecting the polymerisation mixture to a centrifugal force after the inclusion of the electrically conductive material, thereby encouraging the electrically conductive material to settle across the uppermost and/or lowermost region of the polymerisation mixture, prior to polymerising the polymerisation mixture. Subjecting the polymerisation mixture to a centrifugal force increases the settlement rate of the electrically conductive material such that it settles across the uppermost and/or lowermost region of the polymerisation mixture more rapidly.

Use of a Supporting Surface

The electrically conductive material may be included in the polymerisation mixture by arranging the electrically conductive material across a supporting surface, and applying the polymerisation mixture to the electrically conductive material lying across the supporting surface. This is generally applicable to all electrically conductive materials disclosed herein. This results in the electrically conductive material being provided across an uppermost and/or a lowermost region of the polymerisation mixture. Then, after the polymerisation mixture has been polymerised to form an electrically conductive polymer with electrically conductive material integrated into a surface layer, the supporting surface may be removed. The supporting surface is preferably a water soluble resin such as polyvinyl alcohol, polyethylene oxide, or sodium carboxymethyl cellulose, preferably polyvinyl alcohol.

When the electrically conductive material is in particulate form and consists of particles with an aspect ratio of at least 2:1, preferably at least 3:1, the electrically conductive material may be arranged across the supporting surface by orientating the particles of the electrically conductive material such that they are perpendicular to the supporting surface, and then attaching the particles to the supporting surface. The electrically conductive material may be arranged across the supporting surface in this manner by suspending the electrically conductive material in a liquid, drawing the liquid through a porous surface to provide the electrically conductive material as an array of particles attached and perpendicularly orientated to the porous surface, orientating porous surface such that the particles of the electrically conductive material are perpendicular to the supporting surface, attaching the electrically conductive material to the supporting surface, then removing the porous surface. The supporting surface is preferably a water soluble resin such as polyvinyl alcohol, polyethylene oxide, or sodium carboxymethyl cellulose, preferably polyvinyl alcohol. When the supporting surface is a water soluble resin, the particles of the electrically conductive material may be attached to the supporting surface by partially submerging the particles of the electrically conductive material in an aqueous solution of the water soluble resin, and then allowing the aqueous solution of the water soluble resin to solidify, for instance by the application of heat, thereby forming an arrangement of electrically conductive material across a supporting surface of the water soluble resin. The polymerisation mixture can then be applied to the arrangement of electrically conductive material, and after polymerisation, the supporting surface of the water soluble resin may be removed by washing in water, leaving an array of electrically conductive material integrated in and perpendicularly orientated to a surface layer of the resulting polymer. This aspect of the process is shown diagrammatically in FIG. 5.

Double Sided Polymers

As disclosed herein it is possible to form a "double sided" polymer—that is, wherein the electrically conductive material is integrated into both the top surface layer and the bottom surface layer of the polymer. This is achieved in the first aspect by providing the electrically conductive material across both the uppermost region and the lowermost region of the polymerisation mixture. The electrically conductive material can be provided across both the uppermost region and the lowermost region of the polymerisation mixture by a variety of different ways.

For example, when using "settlement under gravity" or "settlement under centrifuge", two different electrically conductive materials can be used, one with a density lower than that of the polymerisation and one with a density higher than that of the polymerisation mixture, resulting in settlement occurring at both the uppermost and lowermost regions of the polymerisation mixture respectively.

Alternatively, any two of "settlement under gravity", "settlement under centrifuge", or "use of a supporting surface" can be combined with each other to arrive at a double sided polymer. For example, either of "settlement under gravity" or "settlement under centrifuge" can be used to provide a polymerisation mixture with electrically conductive material provided across a lowermost region of the polymerisation mixture. Then, a supporting surface with electrically conductive material attached by way of the "use of a supporting surface" methodology can be used to introduce additional electrically conductive material to the uppermost region of the polymerisation mixture. After polymerising the polymerisation mixture, and removal of the supporting surface, a double sided polymer is achieved.

Alternatively, two "single sided" polymers can be made by any one of the techniques disclosed herein and then pressed together about the surfaces which do not contain the integrated electrically conductive material, to form a double sided polymer with electrically conductive material integrated within both outer surfaces. Optionally, the two single sided polymers can be joined together with a layer of additional monomer material which when polymerised forms an interpenetrated network (an IPN) junction at the interface of the two single sided polymers.

Alternatively, any one of the "settlement under gravity", the "settlement under centrifuge", or the "use of a supporting surface" can be used to form a "single sided" polymer, before applying a layer of additional monomer mixture containing additional electrically conductive material, then polymerising this additional monomer mixture, to form a double sided polymer featuring an IPN.

Alternatively, a double sided polymer can be formed by way of the second aspect of the invention. That is, a process of forming an electrically conductive polymer containing an electrically conductive material integrated at both top and bottom surfaces, comprising the steps of:

including an electrically conductive material in a monomer mixture;

applying the monomer mixture across a top surface and a bottom surface of an electrically conductive polymer; and polymerising the monomer mixture;

thereby forming an electrically conductive polymer containing an electrically conductive material integrated at the top and bottom surfaces of said polymer.

The electrically conductive material of the second aspect can have any of the characteristics disclosed in relation to the first aspect, but the second aspect is particularly compatible with electrically conductive material provided as a plurality of fibres (generally activated carbon fibres) woven or felted into a cloth-like fabric. The term "monomer mixture" used in relation to the second aspect refers to an additional monomer mixture to that used to form the electrically conductive polymer, i.e. the double sided polymer is formed by first providing an electrically active polymer, and then applying a layer of additional monomer mixture containing electrically conductive material to both the top and bottom surfaces of the electrically conductive polymer, and subsequently polymerising the additional monomer mixture. This method provides a double sided polymer featuring two IPNs. The monomer mixture can, and preferably does, have any of the characteristics disclosed herein in relation to the "polymerisation mixture" used in the first aspect of the invention. Similarly the monomer mixture can, and preferably is, polymerised under the same conditions as those used to polymerise the electrically conductive polymer. The integrated polymer that the second aspect provides may also be hydrated in the same manner as that described for the first aspect. The thickness of the layer of monomer mixture applied to the top surface and bottom surface in the second aspect can be 5-120 μm, preferably 10-110 μm (values corresponding to the thickness of each layer on each surface). As in the first aspect, the resulting polymer formed by the process of the second aspect may take a variety of different shapes, but generally the polymer will comprise a top surface, a bottom surface, and a number of wall-like sides (typically four). Typically, the polymer approximates to a substantially 3D planar shape. Generally, the thickness of the polymer (i.e. the distance between the top surface and the bottom surface) formed by the process disclosed herein is in the range of 25 μm to 2 mm. Generally, the electrically conductive polymer used in the second aspect is provided by polymerising a polymerisation mixture that features the same monomer types and amounts as those disclosed in relation to the "polymerisation mixture" used in the first aspect.

Disclosed herein is an electrically conductive polymer containing an electrically conductive material integrated in its surface layer, obtainable by the process of the first or second aspect disclosed herein. Preferred features such as the reaction times and reaction conditions, as well as the amounts, chemical nature, and form of the components are disclosed above.

Also provided herein is a process of forming a supercapacitor, comprising the steps of integrating electrically conductive material into a surface layer of an electrically conductive polymer using the process of the first or second aspect disclosed herein, and positioning the resulting integrated polymer between two electrodes. Provided herein is the use of the integrated polymer in a supercapacitor. Also provided herein is a supercapacitor comprising two electrodes and the integrated polymer located therebetween. By positioning/locating the integrated polymer between two electrodes such that the polymer contacts the electrodes, a polymer/electrode interface forms which acts as an effective extended surface area at the polymer/electrode interface. This provides increased capacitance without having to resort to extended surface area electrodes, and so allows increased capacitance to be achieved whilst using simple smooth surface electrodes.

EXAMPLES

Example 1: An Example of the Production and Effect of Using a Single Sided Integrated Membrane/Electrode Structure Reported is a test in which two single sided membrane-electrode structures were made and placed polymer-to-polymer between smooth carbon foil electrodes. As is described below in more detail, it was found that capacitance values of 1.25 F/cm$^2$ were maintained over 500 charge/discharge cycles.

This was compared with the result for a single polymer membrane of the same material (VP-amino acid hydrated in $H_2SO_4$), which was placed between the same smooth carbon foil electrodes and found to give only 0.003 F/cm$^2$.

The tests were carried out using a cell made with a polymer electrolyte membrane consisting of a vinyl pyrrolidone-amino-acid polymer polymerised by UV radiation and containing in one surface an electrically conductive structure consisting of activated carbon fibres woven into a mesh or cloth.

This integrated polymer membrane 3 cm×3 cm was hydrated in 5 molar sulphuric acid solution and pressed against a simple smooth surfaced carbon foil.

A second identical structure was prepared and placed so that the two polymer membranes were in intimate contact thus forming a supercapacitor cell.

The cell was tested by repeatedly charging and discharging it using a Gamry 600 test instrument and the capacitance of the cell was as shown in FIG. 7. The capacitance per unit area of the smooth carbon foil conduction electrodes was between 1.1 and 1.25 Farads per cm$^2$.

As a comparison, a solid polymer electrolyte membrane consisting of a vinyl pyrrolidone-amino-acid polymer polymerised by UV radiation was prepared, hydrated in 5 molar sulphuric acid solution and placed between two smooth carbon foil electrodes to form a supercapacitor cell (i.e. an identical polymer as that used in the example above but made as a simple membrane).

This cell was also tested using a Gamry 600 test instrument and (see FIG. 8) was found to have a capacitance equivalent to only approximately 0.003 F/cm$^2$.

FIG. 7 shows the capacitance of a 9 cm$^2$ cell made with an integrated VP-amino acid polymer integrated into a woven carbon fabric in contact with smooth carbon foil electrodes. The area capacitance is approximately 1.25 Farads per cm$^2$.

FIG. 8 shows the capacitance of a 9 cm$^2$ cell made with a VP-amino acid polymer membrane in contact with smooth carbon foil electrodes. The area capacitance is approximately 0.003 Farads per cm$^2$.

Figure 1:
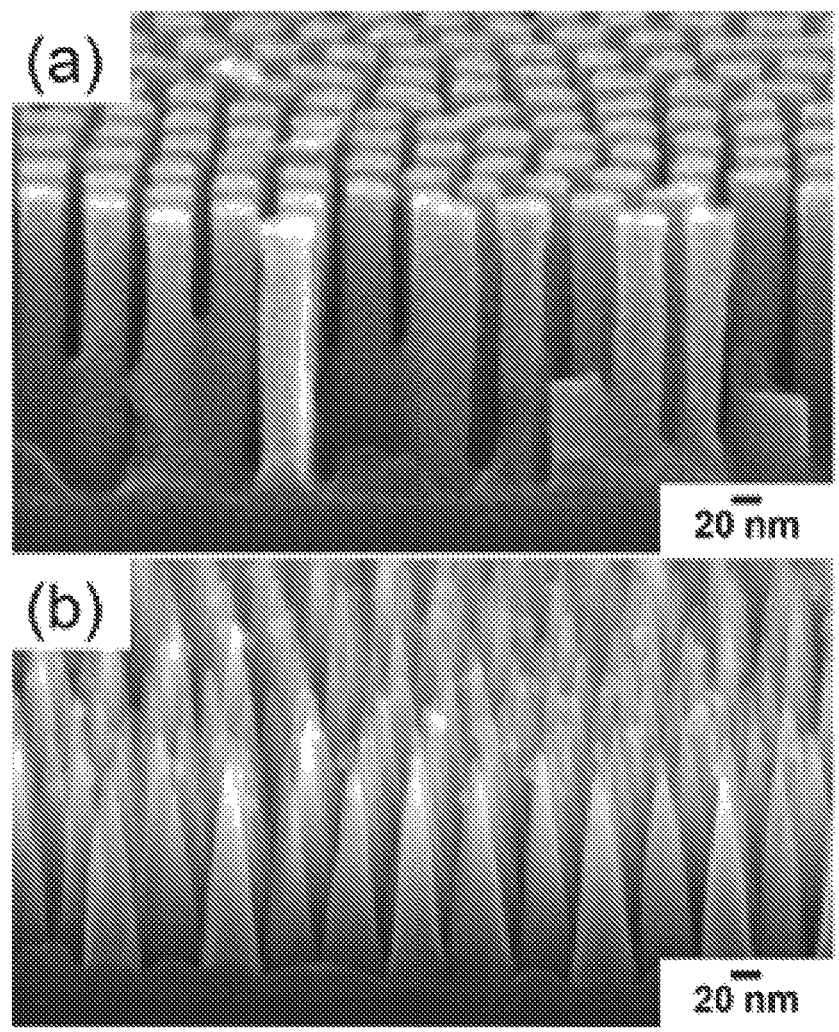
Figure 2:
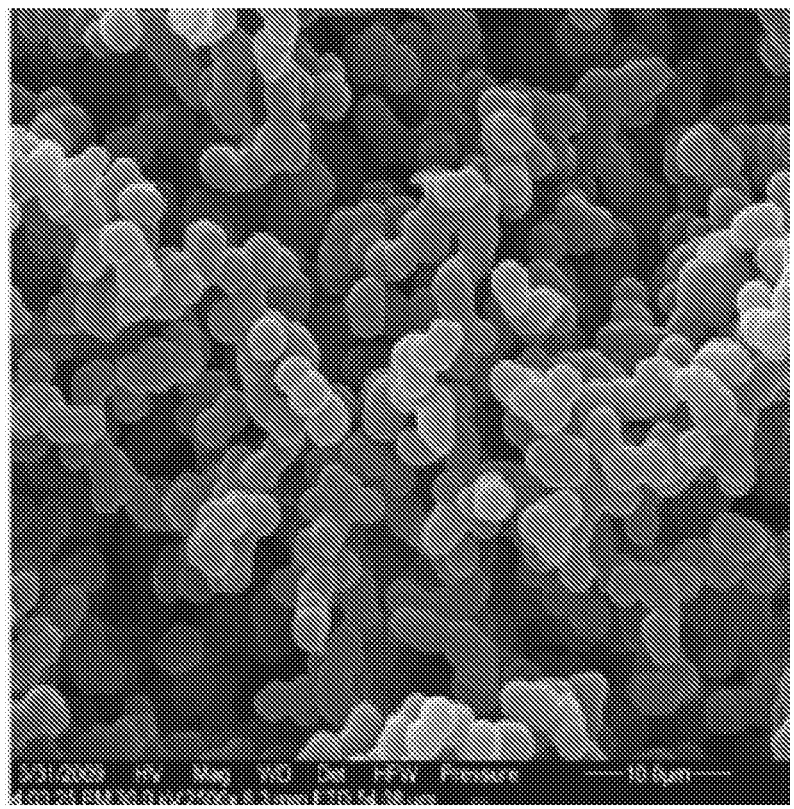

The polymer, the hydration conditions and the operating voltage is the same in both experiments.

FIG. 9 is a microphoto of the integrated polymer/electrode interface as used in the above-described tests. The microphoto shows the polymer layer immediately above and penetrating into the dark fabric.

The invention claimed is:

1. A process of integrating electrically conductive material into a surface layer of an electrically conductive polymer, comprising the steps of:
    including an electrically conductive material in a polymerisation mixture capable of forming an electrically conductive polymer, such that the material is provided across an uppermost and/or a lowermost region of the polymerisation mixture; and
    subsequently polymerising the polymerisation mixture, wherein the density of the electrically conductive material is higher than that of the polymerisation mixture, and wherein either:
        a) the process further comprises allowing the polymerisation mixture to stand for at least 30 seconds after the inclusion of the electrically conductive material, thereby allowing the electrically conductive material to settle across the lowermost region of the polymerisation mixture under gravity, prior to polymerising the polymerisation mixture;
        b) the process further comprises subjecting the polymerisation mixture to a centrifugal force after the inclusion of the electrically conductive material, thereby allowing the electrically conductive material to settle across the lowermost region of the polymerisation mixture, prior to polymerising the polymerisation mixture; or
        c) the electrically conductive material is included in the polymerisation mixture by arranging the electrically conductive material across a supporting surface, and applying the polymerisation mixture to the electrically conductive material across the supporting surface.

2. The process of claim 1, wherein the electrically conductive material is in particulate form.

3. The process of claim 1, wherein the electrically conductive material is electrically conductive carbon, a transition metal oxide, or combinations thereof.

4. The process of claim 3, wherein the electrically conductive carbon is in the form of a plurality of individual activated carbon fibres, a plurality of activated carbon fibres woven or felted into a cloth-like fabric, activated carbon powder, powdered graphite, one or more graphene sheets, powdered graphene, powdered graphane, powdered carbon nanotubes, or combinations thereof.

5. The process of claim 3, wherein the transition metal oxide is MnO, MnO$_2$, NaMnO$_2$, ZnO$_2$, Fe$_2$O$_3$, MoS$_2$, V$_2$O$_5$, RuO$_2$, IrO$_2$, or combinations thereof.

6. The process of claim 4, wherein the electrically conductive carbon is in the form of a plurality of activated carbon fibres woven or felted into a cloth-like fabric, activated carbon powder, powdered graphite, powdered graphene, powdered graphane, powdered carbon nanotubes, or combinations thereof.

7. The process of claim 1, wherein c) is performed, such that the electrically conductive material is included in the polymerisation mixture by arranging the electrically conductive material across a supporting surface, and applying the polymerisation mixture to the electrically conductive material across the supporting surface, and
    wherein the process further comprises the step of removing the supporting surface after polymerising the polymerisation mixture.

8. The process of claim 1, wherein c) is performed, such that the electrically conductive material is included in the polymerisation mixture by arranging the electrically conductive material across a supporting surface, and applying the polymerisation mixture to the electrically conductive material across the supporting surface,
    wherein the electrically conductive material is in particulate form and consists of particles with an aspect ratio of at least 2:1, preferably at least 3:1, and the supporting surface is polyvinyl alcohol, polyethylene oxide, or sodium carboxymethyl cellulose, and
    wherein the electrically conductive material is arranged across the supporting surface by:
        orientating the particles of the electrically conductive material such that they are perpendicular to an aqueous solution of polyvinyl alcohol, polyethylene oxide, or sodium carboxymethyl cellulose;
        partially submerging the particles of the electrically conductive material in the aqueous solution of polyvinyl alcohol, polyethylene oxide, or sodium carboxymethyl cellulose; and
        allowing the aqueous solution of polyvinyl alcohol, polyethylene oxide, or sodium carboxymethyl cellulose to solidify, thereby forming an arrangement of electrically conductive material across a supporting surface of polyvinyl alcohol, polyethylene oxide, or sodium carboxymethyl cellulose.

9. The process of claim 1, wherein the polymerisation mixture is capable of forming a cross-linked polymer.

10. The process of claim 1, wherein the polymerisation mixture is capable of forming a hydrophilic polymer.

11. The process of claim 1, wherein the polymerisation mixture comprises at least one hydrophobic monomer, at least one hydrophilic monomer, and at least one cross-linker, the polymerisation mixture further comprising one or the other of:
    at least one electronically conductive polymer; or
    at least one amino acid.

12. The process of claim 11, wherein the polymerisation mixture comprises at least one hydrophobic monomer, at least one hydrophilic monomer, at least one electronically conductive polymer, and at least one cross-linker.

13. The process of claim 12, wherein the at least one electronically conductive polymer is selected from polyethylenedioxythiophene, preferably, polyethylenedioxythiophene: polystyrene sulphonate, polypyrrole, polyaniline, polyacetylene, or a combination thereof.

14. The process of claim 11, wherein the electrically conductive cross-linked polymer is formed by polymerising a polymerisation mixture, the polymerisation mixture comprising at least one hydrophobic monomer, at least one hydrophilic monomer, at least one amino acid, and at least one cross-linker.

15. The process of claim 14, wherein the at least one amino acid is selected from phenylalanine, tryptophan, histidine, ethylenediaminetetraacetic acid (EDTA) and tyrosine, or a combination thereof.

16. The process of claim 11, wherein the at least one hydrophobic monomer is selected from methyl methacrylate, allyl methacrylate, acrylonitrile, methacryloxypropyl-tris(trimethylsiloxy) silane, 2,2,2-trifluoroethyl methacrylate, or a combination thereof.

17. The process according to claim 11, wherein the at least one hydrophilic monomer is selected from methacrylic acid, 2-hydroxyethyl methacrylate, ethyl acrylate, vinyl pyrrolidone, propenoic acid methyl ester, monomethacryloyloxyethyl phthalate, ammonium sulphatoethyl methacrylate, poly vinyl alcohol or a combination thereof.

18. The process according to claim 11, wherein the at least one cross-linker is allyl methacrylate, ethylene glycol dimethacrylate, or combinations thereof.

19. The process of claim 11, wherein the polymerisation mixture is polymerised by thermal, gamma or UV radiation.

20. A process of forming a supercapacitor, comprising the steps of:
integrating electrically conductive material into a surface layer of an electrically conductive polymer using the process of claim 1; and
positioning the electrically conductive polymer between two electrodes.

21. An electrically conductive polymer containing an electrically conductive material integrated in a surface layer, obtainable-obtained by the process according to claim 1.

22. The electrically conductive polymer according to claim 21 wherein the electrically conductive material is in particulate form.

23. The electrically conductive polymer according to claim 21, wherein the electrically conductive material is electrically conductive carbon, a transition metal oxide, or combinations thereof.

24. The electrically conductive polymer according to claim 23, wherein the electrically conductive carbon is present in the electrically conductive material in the form of a plurality of individual activated carbon fibres, a plurality of activated carbon fibres woven or felted into a cloth-like fabric, activated carbon powder, powdered graphite, one or more graphene sheets, powdered graphene, powdered graphane, powdered carbon nanotubes, or combinations thereof.

25. An electrically conductive polymer containing an electrically conductive material integrated in a surface layer, obtainable by the process according to claim 1,
wherein the electrically conductive material is a transition metal oxide and optionally comprises an electrically conductive carbon, and
wherein the transition metal oxide is MnO, $MnO_2$, $NaMnO_2$, $ZnO_2$, $Fe_2O_3$, $MoS_2$, $V_2O_5$, $RuO_2$, $IrO_2$, or combinations thereof.

26. The electrically conductive polymer according to claim 23, wherein the electrically conductive carbon is present in the electrically conductive material in the form of a plurality of activated carbon fibres woven or felted into a cloth-like fabric, activated carbon powder, powdered graphite, powdered graphene, powdered graphane, powdered carbon nanotubes, or combinations thereof.

27. The electrically conductive polymer according to claim 21, wherein the electrically conductive polymer is cross-linked.

28. The electrically conductive polymer according to claim 21, wherein the electrically conductive polymer is hydrophilic.

29. Use of the electrically conductive polymer according to claim 21 in a supercapacitor.

30. A supercapacitor comprising two electrodes and the electrically conductive polymer according to claim 21 located therebetween.

31. Use of the electrically conductive polymer according to claim 21 in an electrochemical cell.

32. An electrochemical cell comprising two electrodes and the electrically conductive polymer according to claim 21 located therebetween.

33. A process of forming an electrically conductive polymer containing an electrically conductive material integrated at both top and bottom surfaces, comprising the steps of:
including an electrically conductive material in a monomer mixture;
applying the monomer mixture across a top surface and a bottom surface of an electrically conductive polymer; and
polymerising the monomer mixture; thereby forming an electrically conductive polymer containing an electrically conductive material integrated at the top and bottom surfaces of said polymer.

34. The process according to claim 33, wherein the electrically conductive material is electrically conductive carbon, a transition metal oxide, or combinations thereof.

* * * * *